United States Patent
Emery

(10) Patent No.: US 9,717,339 B2
(45) Date of Patent: Aug. 1, 2017

(54) COMPUTING ACCESSORY MOUNTING APPARATUS

(71) Applicant: Microsoft Technology Licensing, LLC, Redmond, WA (US)

(72) Inventor: William Loren Emery, Sherwood, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/572,219

(22) Filed: Dec. 16, 2014

(65) Prior Publication Data
US 2016/0166060 A1    Jun. 16, 2016

(51) Int. Cl.
*A47B 97/00*      (2006.01)
*H01F 7/04*       (2006.01)
*F16M 13/02*      (2006.01)
*G06F 1/16*       (2006.01)

(52) U.S. Cl.
CPC ........... *A47B 97/00* (2013.01); *F16M 13/022* (2013.01); *G06F 1/1607* (2013.01); *H01F 7/04* (2013.01); *A47B 2097/005* (2013.01)

(58) Field of Classification Search
CPC ...... F16M 13/02; F16M 13/00; F16M 13/022; A47G 1/17; F16B 2001/0035; A47B 97/00; A47B 2097/005; G06F 1/1607; H01F 7/04
USPC ....................... 248/206.5, 918, 917, 919, 923
See application file for complete search history.

(56) References Cited

U.S. PATENT DOCUMENTS

| | | | | |
|---|---|---|---|---|
| 2,876,359 A | * | 3/1959 | Plymale | G03B 42/025 248/206.5 |
| 3,221,893 A | * | 12/1965 | Glaberson | A47F 5/0876 211/103 |
| 3,482,910 A | * | 12/1969 | Debelius | G03B 21/64 16/265 |

(Continued)

FOREIGN PATENT DOCUMENTS

GB       2446612 A       8/2008
WO    2014063399 A1      5/2014

OTHER PUBLICATIONS

"Wallee M—Modular Magnetic Phone Mounting System", Published on: Nov. 16, 2013, Available at: https://www.kickstarter.com/projects/studioproper/wallee-m-modular-magnetic-phone-mounting-system.

(Continued)

*Primary Examiner* — Nkeisha Smith
(74) *Attorney, Agent, or Firm* — Alleman Hall Creasman & Tuttle LLP

(57) ABSTRACT

The disclosure provides for a mounting apparatus for mounting a computing accessory to a display device. The mounting apparatus includes an attachment portion for holding a computing accessory body. An extension extends away from the attachment portion and includes one or more permanent magnets. When the mounting apparatus is in a mounted location on the display device, (i) a display-facing portion of the extension extends along and faces a rear surface of the display device; (ii) the one or more permanent magnets attract the extension to ferromagnetic material in the display device to magnetically hold the mounting apparatus in the mounted location; and (iii) the attachment portion holds the computing accessory body adjacent an outer edge of the display device.

12 Claims, 4 Drawing Sheets

(56) References Cited

U.S. PATENT DOCUMENTS

| | | | | |
|---|---|---|---|---|
| 4,767,093 A * | 8/1988 | Jones | ................... | G06F 1/1611 248/205.2 |
| 4,776,549 A * | 10/1988 | Anastos | ................... | A47G 1/17 248/206.5 |
| 4,902,078 A * | 2/1990 | Judd | ....................... | B41J 29/15 24/545 |
| 4,960,257 A * | 10/1990 | Waters | .................. | G06F 1/1611 248/442.2 |
| 5,082,235 A * | 1/1992 | Crowther | ............ | A47B 21/045 248/231.41 |
| 5,190,258 A * | 3/1993 | Yu | ......................... | F16M 11/12 248/279.1 |
| 5,505,421 A * | 4/1996 | Marthaler | ........... | A47B 21/045 248/442.2 |
| 5,639,060 A * | 6/1997 | Spoonts | ................ | F16M 13/02 211/88.01 |
| 5,803,424 A * | 9/1998 | Keehn | ................... | G06F 1/1609 248/489 |
| 5,890,309 A * | 4/1999 | Markarian | ............... | G09F 7/22 40/605 |
| 5,901,937 A * | 5/1999 | Compeau | ............ | A47B 21/045 248/205.1 |
| 6,100,942 A * | 8/2000 | Hollenbaugh | ........ | G06F 1/1607 248/220.22 |
| 6,145,799 A * | 11/2000 | Khon | ................... | A47B 21/045 248/206.5 |
| 6,290,200 B1 * | 9/2001 | Ko | ....................... | A47B 21/045 248/442.2 |
| 6,311,946 B1 * | 11/2001 | Hoffman | ............... | F16M 13/02 248/205.2 |
| 6,412,744 B1 * | 7/2002 | Wollam | .............. | A47B 21/045 248/442.2 |
| 6,418,010 B1 * | 7/2002 | Sawyer | .............. | B60R 11/0235 248/918 |
| 6,527,237 B2 * | 3/2003 | Harary | .................. | H04R 1/026 181/141 |
| 6,543,168 B1 * | 4/2003 | Moore | ................. | G06F 1/1607 40/725 |
| 6,550,737 B1 * | 4/2003 | Sai | ........................ | F16M 13/02 211/69.1 |
| 6,721,434 B2 * | 4/2004 | Polk, Jr. | ................ | G06F 1/1605 381/307 |
| 6,888,940 B1 | 5/2005 | Deppen | | |
| 7,374,052 B2 * | 5/2008 | Price | ........................ | A47F 5/00 211/103 |
| 7,431,251 B2 | 10/2008 | Carnevali | | |
| 7,961,068 B2 | 6/2011 | Fullerton et al. | | |
| 8,016,255 B2 * | 9/2011 | Lin | ....................... | G06F 1/1607 248/205.1 |
| 8,055,009 B2 * | 11/2011 | Porter | .................... | H04R 5/02 248/918 |
| 8,111,865 B2 * | 2/2012 | Lau | ........................ | H04R 1/026 381/386 |
| 8,138,869 B1 | 3/2012 | Lauder et al. | | |
| 8,297,569 B2 | 10/2012 | Kuhn et al. | | |
| 8,429,771 B2 | 4/2013 | Long | | |
| 8,567,744 B1 | 10/2013 | Marn et al. | | |
| 8,727,290 B1 | 5/2014 | De La Matta et al. | | |
| 2006/0237605 A1 * | 10/2006 | Joyce | .................... | A47F 5/0807 248/206.5 |
| 2010/0102182 A1 | 4/2010 | Lin | | |
| 2010/0116955 A1 * | 5/2010 | Hayes | ................... | A47K 10/04 248/206.5 |
| 2010/0187386 A1 * | 7/2010 | Price | ........................ | A47F 5/00 248/206.5 |
| 2011/0064401 A1 | 3/2011 | Desorbo | | |
| 2011/0069404 A1 | 3/2011 | Lappin | | |
| 2012/0168582 A1 * | 7/2012 | Kelly | ................... | A47B 96/022 248/206.5 |
| 2012/0273630 A1 | 11/2012 | Gillespie-Brown et al. | | |
| 2013/0140414 A1 * | 6/2013 | Copeman | ............. | B62D 25/182 248/206.5 |
| 2013/0313387 A1 * | 11/2013 | Ly | .......................... | F16M 13/02 248/205.3 |
| 2014/0159557 A1 | 6/2014 | Gordon | | |
| 2014/0245592 A1 | 9/2014 | Burkhart et al. | | |

OTHER PUBLICATIONS

"Mi-T Grip Dash Mount", Published on: Mar. 31, 2013, Available at: http://www.bracketron.com/products/mi-t-grip-dash-mount#.VFMel_mUfv4.

"Neo-Flex® Desk Mount Tablet Arm", Published on: Nov. 15, 2012, Available at: http://www.ergotron.com/ProductsDetails/tabid/65/PRDID/576/language/hi-IN/Default.aspx.

"Section 7, Leveling Elements: Leveling Mounts, Leveling Feet, and Threaded Tube Ends and Inserts", J.W. Winco Inc, http://www.jwwinco.com/products/section7, Available as early as Jun. 4, 2010, Accessed Nov. 4, 2014, Retrieved Feb. 17, 2016, 3 pages.

"Logitech HD Webcam C525", Logitech Products, www.logitech.com/en-us/product/hd-webcam-c525?#section=gallery, Available as early as Dec. 3, 2012, Accessed Oct. 7, 2013, Retrieved Feb. 17, 2016, 2 pages.

ISA European Patent Office, International Search Report and Written Opinion Issued in Application No. PCT/US2015/063562, Mar. 7, 2016, WIPO, 13 Pages.

IPEA European Patent Office, Second Written Opinion Issued in PCT Application No. PCT/US2015/063562, Sep. 15, 2016, WIPO, 8 pages.

IPEA European Patent Office, International Preliminary Report on Patentability Issued in PCT Application No. PCT/US2015/063562, Mar. 8, 2017, WIPO 8 pages.

* cited by examiner

COMPUTING ACCESSORY MOUNTING APPARATUS

BACKGROUND

In a variety of computing environments, it is desirable to mount a computing accessory to a display device. Various attachment mechanisms have been used to achieve such mounting. In some cases a clip structure is used to grasp an edge of the display device. This is often used, for example, with small cameras mounted to the top edge of a display device. Clips, however, can be prone to breakage, e.g., as a result of mishandling or another object bumping against the accessory. Clips can also limit the locations at which the accessory can be mounted, e.g., they are often mainly useful for mounting accessories to the top edge a computer monitor.

A hook-and-loop fastener, such as Velcro, is another example of an attachment mechanism. This, however, can wear over time so that the holding force becomes insufficient. This also requires selection of a particular mounting location. The accessory therefore cannot be flexibly and easily removed and/or repositioned, and the mounting location cannot be used for another, different, computing accessory. Use of adhesive, such as with various tapes, can also suffer from these disadvantages.

In some cases the display device itself includes a specific mounting feature specially designed for a particular accessory. For example a stylus dock is sometimes integrated into the edge of a computer monitor. This limits the stylus to being mounted in one location, and it prevents that edge location from potentially being used for a different computing accessory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The disclosure provides for a mounting apparatus for selectively and releasably mounting a computing accessory to a display device. The mounting apparatus includes an attachment portion for holding a computing accessory body. An extension extends away from the attachment portion and includes one or more permanent magnets. When the mounting apparatus is in a mounted location on the display device, (i) a display-facing portion of the extension extends along and faces a rear surface of the display device; (ii) the one or more permanent magnets attract the extension to ferromagnetic material in the display device to magnetically hold the mounting apparatus in the mounted location; and (iii) the attachment portion holds the computing accessory body adjacent an outer edge of the display device.

DETAILED DESCRIPTION

The present description contemplates a mounting apparatus for a computing accessory. The mounting apparatus enables the computing accessory to be placed in a mounted location on a display device so that the computing accessory body is adjacent an outer edge of the display device. A portion of the mounting apparatus extends along the rear surface of the display device, and carries magnets that attract the extending portion to ferromagnetic material in the display device. In appropriately-configured display devices, this allows the computing accessory to be held securely in any desired location around the outer edge of the display device. The computing accessory can be easily removed and then replaced, in either the original position or another desired location. When multiple computing accessories are employed, the mounting apparatus may allow them to be flexibly deployed and rearranged as desired around the periphery of the display device. If excessive force is applied to the accessory, it may separate and break away from the display device without damaging either the display device or the computing accessory.

Figure 1:
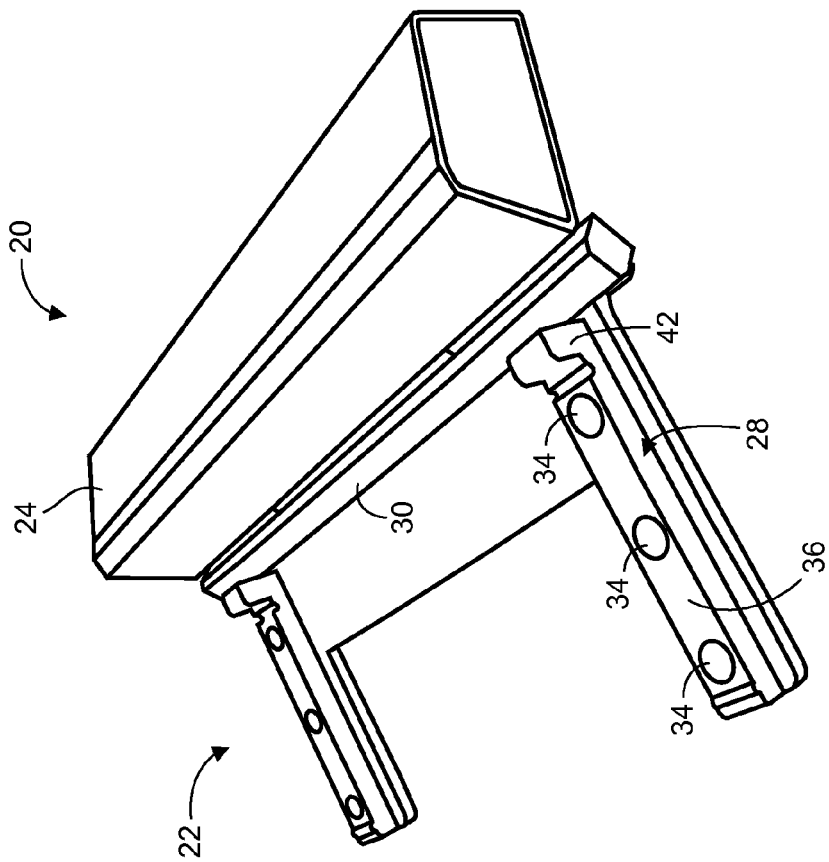
FIG. 1 shows a perspective view of an example embodiment of a computing accessory according to one aspect of the disclosure, including a mounting apparatus for selectively mounting a computing accessory body to a display device.

Referring now to the figures, FIG. 1 depicts a computing accessory 20 according to the present description, including a mounting apparatus 22 and a computing accessory body 24. The mounting apparatus 22 is configured such that the computing accessory 20 can be selectively mounted to one or more mounted locations on a display device, such as display device 26 of FIG. 2 (showing a side view of an upper edge portion the display device 26). For ease of illustration, FIG. 2 omits certain components of FIG. 1, and focuses on a side view of an extension 28 of the mounting apparatus 22.

In the example of FIG. 1, computing accessory body 24 takes the form of a depth camera, for example to be positioned at the top edge of a television or computer monitor. However, the mounting mechanisms described herein can be used on a nearly limitless range of other computing accessories. Other examples include other camera types; speakers or other audio output devices; microphones; keyboards; mice; styluses; gaming controllers; audio headsets; etc.

The description also contemplates accessory mounting on a wide range of display devices. Examples include televisions, computer monitors of various configurations, laptop displays, tablet device displays, mobile phone displays, etc.

Continuing with the figures, mounting apparatus 22 may include an attachment portion 30 (FIG. 1). When the mounting apparatus 22 and computing accessory is in a mounted position/location on a display device, the attachment portion holds the computing accessory body 24 adjacent an outer edge of the display device. Though not shown in FIG. 2, the general location of computing accessory body 24 and attachment portion 30 are indicated at location L, adjacent an outer edge 32 (e.g., the top edge) of display device 26. Extension 28 extends away from attachment portion 30 and computing accessory body 24, and as shown, may include one or more permanent magnets 34.

The attachment portion 30 that holds the computing accessory body 24 may be configured in various ways. In some examples, the attachment portion 30 allows for the position of the computing accessory body 24 to be adjusted relative to the remainder of the mounting apparatus 22. Any type of positional adjustment may be employed, including translation along any axis and/or rotation about any axis. In the specific example of FIG. 1, attachment portion 30 enables the depth camera to be pivoted, e.g., to appropriately aim the camera at the scene to be captured. The attachment portion may also be constructed to enable selective removal and attachment of the computing accessory body 24, e.g., by implementing it as a specialized dock, through use of magnets, etc. In such a case, the mounting apparatus 22 stays in place on the display, while the computing accessory body 24 is selectively removed and replaced. Such a configuration may be desirable in the context of a stylus, gaming controller, keyboard or other device that is designed for use at a distance from the display. For these devices, the mounting apparatus 22 provides a convenient and flexible way to dock the accessory when it is not in use.

Figure 2:
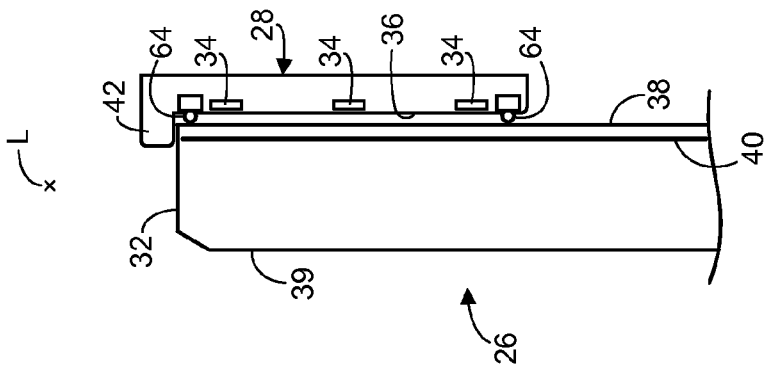
FIG. 2 shows a side view of a portion of the mounting apparatus of FIG. 1, in a mounted location on a display device, particularly showing an extension of the mounting apparatus including one or more magnets for holding the mounting apparatus to a rear surface of the display device.

Attachment portion 30 and extension 28 are configured such that, when the computing accessory is in the mounted location on the display device, a display-facing portion 36 of the extension extends along and faces a rear surface 38 of display device 26 (FIG. 2). In this position, magnets 34 attract the extension to ferromagnetic material 40 in display device 26. As a result, the attachment portion 30 holds the computing accessory body 24 in a location adjacent outer edge 32 of the display device 26.

Mounting apparatus 22 may further include a positioning guide 42. As best seen in FIG. 2, positioning guide 42 may abut against outer edge 32 of the display device 26, and may protrude inwardly over the outer edge 32 toward a front side 39 of the display device 26. In some cases, the positioning guide may be elongated (i.e., extending into and out of the page in FIG. 2), for example so that it extends along all or a significant portion of the length of the computing accessory body 24.

Positioning guide 42 in some cases will facilitate positioning of the computing accessory body 24 in a desired location adjacent the outer edge 32 of the display device 26. For example, the positioning guide 42, by abutting the edge of the display device 26, can serve as a guide for when a user places the computing accessory onto the display device 26, and can prevent further movement of the mounting apparatus 22 toward the interior of the back side of the display device 26.

Figure 3:
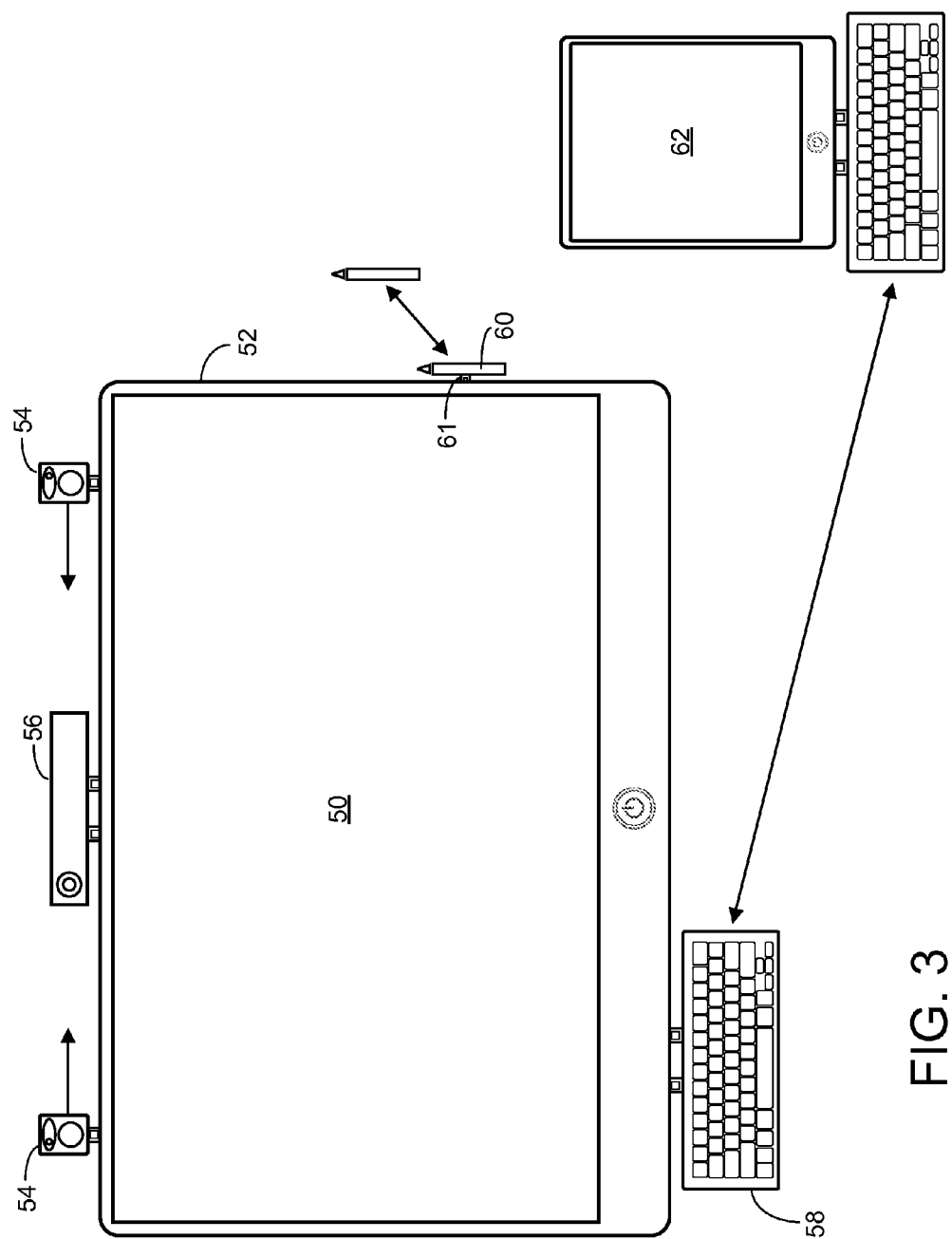
FIG. 3 depicts an example use scenario including various computing accessories that employ mounting apparatuses similar to that of FIGS. 1 and 2, to enable the computing accessories to be positioned adjacent an outer edge of a display device.

FIG. 3 depicts an exemplary use scenario including a display device 50 with a number of different computing accessories positioned at various locations adjacent an outer edge 52 of the display device 50. The figure shows the front side of the display device 50; the computing accessories are magnetically held to the back side of the display device 50 via mounting apparatuses 22 similar to that of FIGS. 1 and 2. The computing accessories include speakers 54, camera 56, keyboard 58 and stylus 60.

As with the example of FIG. 2, display device 50 includes ferromagnetic material that allows the mounting apparatus 22 to hold the computing accessories in place. The ferromagnetic material may be directly on the rear surface of the display device 50, or at some depth within a housing of the display device 50, for example a plastic outer housing. In any case, the ferromagnetic material extends toward the periphery of the display device 50, to enable the computing accessories to be positioned as shown with mounting apparatuses 22 similar to that shown in FIGS. 1 and 2. The mounting apparatuses 22 discussed herein may be used with a wide variety of display devices 50, as display devices 50 typically have ferromagnetic material at or slightly under their back surfaces and extending substantially all the way toward the edges of the display device 50. For example, it is common to employ a piece of sheet metal near the back of a display device 50 to serve as a structural foundation or for other purposes.

The mounting apparatuses 22 may be configured so that they can easily be relocated to a different mounted location on the display device 50, so that the associated computing accessory body 24 is in a different position adjacent the outer edge 32 of the display device 50. FIG. 3 shows an example of this, in which speakers 54 may be moved inward toward camera 56. This could be done to change the stereo separation provided by the speakers 54, to accommodate placement of other accessories, etc. Further illustrating the flexibility and adaptability of the described mounting apparatuses 22, the mounting apparatus 22 used with keyboard 58 enables it to be easily mounted in similar fashion to a different display device 62.

In some examples, the attachment portion is configured to enable the computing accessory body 24 to be selectively held on and removed from the attachment portion. This enables the accessory itself to be removed and replaced while the remainder of the mounting apparatus 22 stays fixed in its mounted location on the display device 50. This can be seen with stylus 60 in FIG. 3, which can be selectively placed on and removed from attachment portion 61. In some examples, such an attachment portion will be implemented to magnetically hold the accessory body while the removable accessory is not in use.

In some examples, it will be desirable to provide some amount of spacing between magnets used with the mounting apparatus and the rear surface of the display device 50. In particular, relatively more or less spacing will affect the magnetic holding strength of the mounting apparatus 22. Spacing may also be desirable to protect the surfaces of the mounting apparatus 22 and/or display device 50 from marring, scratching etc.

Referring to FIG. 2, a spacer element may be provided on the display-facing portion 36 of extension 28. In the depicted example, the spacer element takes the form of feet 64 protruding inwardly toward rear surface 38. Feet 64 space magnets 34 from the rear surface 38 of display device 26. The particular length and dimensions of the feet 64 may be selected to provide a desired magnetic holding force; to provide a desired separation between rear surface 38 and the display-facing portion 36 of extension 28; etc. Material used for the feet 64 may also be selected to protect against marring and scratching.

Figure 4:
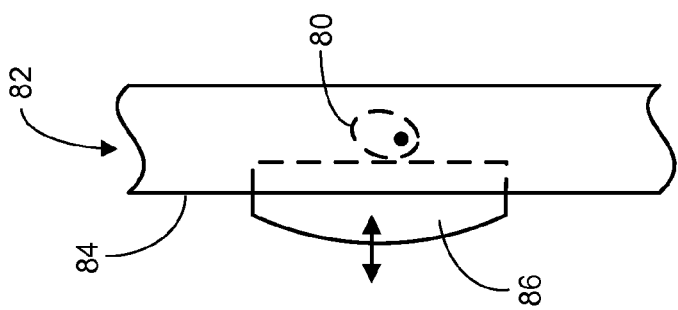
FIGS. 4 and 5 are side views that depict examples of adjustable feet that may be employed in connection with an extension similar to the extension shown in FIG. 2.

In some examples, an adjuster may be provided in connection with a foot to adjust the extent to which the foot protrudes inwardly toward the rear of the display device 50. FIG. 4 depicts an example of an adjuster in the form of a thread mechanism 66 used with extension 68. Extension 68 may be similar to extension 28 of FIG. 2. Among other things, extension 68 includes a display-facing portion 70 and carries one or more permanent magnets to attract with ferromagnetic material in a display device 50. As indicated, operation of thread mechanism 66 adjusts the extent to which foot 72 protrudes inwardly.

Figure 5:
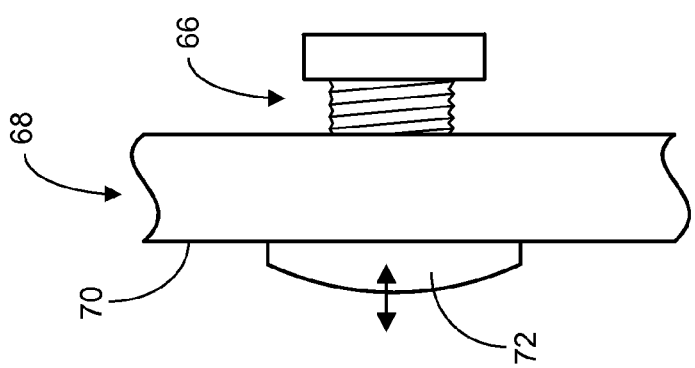

FIG. 5 depicts another example of an adjuster in the form of a cam mechanism 80 used with extension 82. Extension 82 may be similar to extension 28 of FIG. 2. Among other things, extension 82 includes a display-facing portion 84 and carries one or more permanent magnets to attract with ferromagnetic material in a display device 50. As indicated, operation of cam mechanism 80 adjusts the extent to which foot 86 protrudes inwardly. Cam mechanism 80 may be adjusted with a knob, recessed screw, or any other suitable structure/mechanism.

Figure 6:
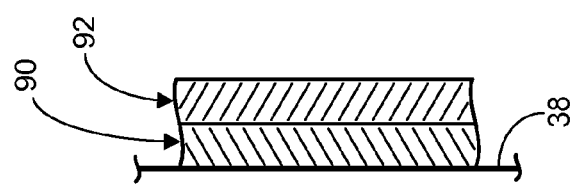
FIG. 6 depicts, for a magnet that may be used in connection with the extension of FIG. 2, a material covering the magnet and positioned between the magnet and the rear surface of the display device of FIG. 2.

FIG. 6 depicts another example of a spacer element to space one or more magnets from the rear surface of a display device 50, where the magnets are carried on or part of an extension similar to extension 28 of FIG. 2. The spacer element in the depicted example takes the form of a layer of material 90 that covers magnet 92 and is positioned between the magnet and the rear surface 38 of the display device 26 shown in FIG. 2.

Figure 7:
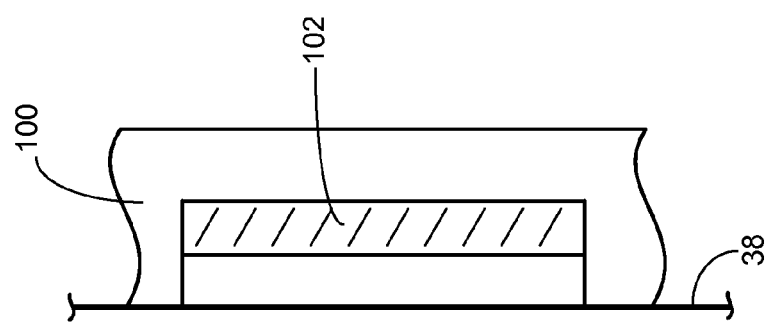
FIG. 7 depicts a recessed magnet configuration that may be used in connection with the example of FIG. 2.

FIG. 7 is a side view depicting a further example embodiment of an extension 100 that may be used in connection with the mounting apparatuses 22 discussed herein. Extension 100 may be similar to extension 28 of FIG. 2, in that the extension 100 extends along rear surface 38 of the display device 26 and carries a permanent magnet 102. In this example, the permanent magnet 102 is recessed into the display-facing portion of the extension 100. Recessing the permanent magnet 102 in this manner can create a spacing from the display device 26 to provide a desired amount of holding force.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect, a mounting apparatus for selectively mounting a computing accessory to a display device is provided. The mounting apparatus includes an attachment portion configured to hold a computing accessory body; and an extension extending away from the attachment portion and including one or more permanent magnets, where the attachment portion and extension are configured such that, when the mounting apparatus is in a mounted location on the display device, (i) a display-facing portion of the extension extends along and faces a rear surface of the display device; (ii) the one or more permanent magnets attract the extension to ferromagnetic material in the display device to magnetically hold the mounting apparatus in the mounted location; and (iii) the attachment portion holds the computing accessory body adjacent an outer edge of the display device.

In this aspect, the extension may be configured to enable the mounting apparatus to be relocated to a different mounted location so that the attachment portion holds the computing accessory body in a different position adjacent the outer edge of the display device.

In this aspect, the attachment portion may be configured to enable the computing accessory body to be selectively held on and removed from the attachment portion.

In this aspect, the mounting apparatus may further include a positioning guide attached to the extension and configured to abut against the outer edge of the display device when the mounting apparatus is in the mounted location. The positioning guide may be elongated and extend along the outer edge of the display device. The positioning guide may include a portion protruding inwardly over the outer edge toward a front side of the display device.

In this aspect, the mounting apparatus may further include a spacer element on the display-facing portion of the extension to space the one or more permanent magnets from the rear surface of the display device. The spacer element may be a material that covers the one or more permanent magnets and is positioned between the one or more permanent magnets and the rear surface of the display device when the mounting apparatus is in the mounted location. The spacer element may be a foot that protrudes from the display-facing portion of the extension inwardly toward the rear surface of the display device. There may be an adjuster operatively coupled to the foot and configured to adjust the extent to which the foot protrudes inwardly. The adjuster may include a thread mechanism to adjust the extent of protrusion. The adjuster may include a cam mechanism to adjust the extent of protrusion.

In this aspect, the one or more permanent magnets may be recessed into the display-facing portion of the extension.

According to another aspect, a computing accessory configured to be selectively mounted to a display device is provided. The computing accessory includes a computing accessory body; and an extension attached to the computing accessory body via an attachment portion configured to hold the computing accessory body, the extension extending away from the computing accessory body and including one or more permanent magnets, where the attachment portion and extension are configured such that, when the computing accessory is in a mounted location on the display device, (i) a display-facing portion of the extension extends along and faces a rear surface of the display device; (ii) the one or more permanent magnets attract the extension to ferromagnetic material in the display device to magnetically hold the computing accessory in the mounted location; and (iii) the attachment portion holds the computing accessory body adjacent an outer edge of the display device.

In this aspect, the extension may be configured to enable the computing accessory to be relocated to a different mounted location so that the attachment portion holds the computing accessory body in a different position adjacent the outer edge of the display device.

In this aspect, the computing accessory may include a positioning guide attached to the extension and configured to abut against the outer edge of the display device when the computing accessory is in the mounted location, the positioning guide including a portion protruding inwardly over the outer edge toward a front side of the display device.

In this aspect, the computing accessory may include a spacer element on the display-facing portion of the extension to space the one or more permanent magnets from the rear surface of the display device. The spacer element may be a material that covers the one or more permanent magnets and is positioned between the one or more permanent magnets and the rear surface of the display device when the computing accessory is in the mounted location. The spacer element may be a foot that protrudes from the display-facing portion of the extension inwardly toward the rear surface of the display device, with an adjuster is operatively coupled to the foot and configured to adjust the extent to which the foot protrudes inwardly.

According to another aspect, a computing accessory configured to be selectively mounted to a display device is provided. The computing accessory includes a computing accessory body; an extension attached to the computing accessory body via an attachment portion configured to hold the computing accessory body, the extension extending away from the computing accessory body and including one or more permanent magnets, where the attachment portion and extension are configured such that, when the computing accessory is in a mounted location on the display device, (i) a display-facing portion of the extension extends along and faces a rear surface of the display device; (ii) the one or more permanent magnets attract the extension to ferromagnetic material in the display device to magnetically hold the computing accessory in the mounted location; and (iii) the attachment portion holds the computing accessory body adjacent an outer edge of the display device; a positioning guide attached to the extension and configured to abut against the outer edge of the display device, the positioning guide including a portion protruding inwardly over the outer edge toward a front side of the display device; where the extension is configured to enable the mounting apparatus to be relocated to a different mounted location so that the attachment portion holds the computing accessory body in different position adjacent the outer edge of the display device; and where the attachment portion is configured to enable the computing accessory body to selectively held on and removed from the attachment portion.

The invention claimed is:

1. A computing accessory mounting system, comprising:
   a display device; and
   a mounting apparatus including:
     an attachment portion configured to hold a computing accessory body;
     an extension extending away from the attachment portion and including one or more permanent magnets, the mounting apparatus mounted on the display device in a mounted location such that (i) a display-facing portion of the extension extends along and faces a rear surface of the display device; (ii) the one or more permanent magnets attract the extension to ferromagnetic material in the display device to magnetically hold the mounting apparatus in the mounted location on the display device; and (iii) the attachment portion holds the computing accessory body adjacent an outer edge of the display device;
     a positioning guide attached to the extension and configured to abut against the outer edge of the display device when the mounting apparatus is in the mounted location, the positioning guide including a portion configured to protrude inwardly over the outer edge toward a front side of the display device;
     a spacer element on the display-facing portion of the extension configured to space the one or more permanent magnets from the rear surface of the display device; and
     an adjuster operatively coupled to the spacer element and configured to adjust an extent to which the spacer element protrudes inwardly toward the rear surface of the display device.

2. The computing accessory mounting system of claim 1, where the extension is further configured to enable the mounting apparatus to be relocated to a different mounted location so that the attachment portion holds the computing accessory body in a different position adjacent the outer edge of the display device.

3. The computing accessory mounting system of claim 1, where the attachment portion is configured to enable the computing accessory body to be selectively held on and removed from the attachment portion.

4. The computing accessory mounting system of claim 1, where the positioning guide is elongated and extends along the outer edge of the display device.

5. The computing accessory mounting system of claim 1, where the spacer element is a material that covers the one or more permanent magnets and is positioned between the one or more permanent magnets and the rear surface of the display device when the mounting apparatus is in the mounted location.

6. The computing accessory mounting system of claim 1, where the spacer element is a foot that protrudes from the display-facing portion of the extension inwardly toward the rear surface of the display device.

7. The computing accessory mounting system of claim 1, where the adjuster includes a thread mechanism to adjust the extent of protrusion.

8. The computing accessory mounting system of claim 1, where the adjuster includes a cam mechanism to adjust the extent of protrusion.

9. The computing accessory mounting system of claim 1, where the one or more permanent magnets are recessed into the display-facing portion of the extension.

10. A computing accessory mounting system, comprising:
    a display device;
    a computing accessory body; and
    an extension attached to the computing accessory body via an attachment portion configured to hold the computing accessory body, the extension extending away from the computing accessory body and including one or more permanent magnets, the extension mounted on the display device in a mounted location such that (i) a display-facing portion of the extension extends along and faces a rear surface of the display device; (ii) the one or more permanent magnets attract the extension to ferromagnetic material in the display device to magnetically hold the extension in the mounted location on the display device; and (iii) the attachment portion holds the computing accessory body adjacent an outer edge of the display device;
    a positioning guide attached to the extension and configured to abut against the outer edge of the display device when the mounting apparatus is in the mounted location, the positioning guide includes a portion configured to protrude inwardly over the outer edge toward a front side of the display device; and
    a spacer element on the display-facing portion of the extension configured to space the one or more permanent magnets from the rear surface of the display device; and
    where the spacer element is a foot that protrudes from the display-facing portion of the extension inwardly toward the rear surface of the display device, and where an adjuster is operatively coupled to the foot and configured to adjust an extent to which the foot protrudes inwardly toward the rear surface of the display device.

11. The computing accessory mounting system of claim 10, where the extension is further configured to enable the computing accessory to be relocated to a different mounted location so that the attachment portion holds the computing accessory body in a different position adjacent the outer edge of the display device.

12. The computing accessory mounting system of claim 10, where the spacer element is a material that covers the one or more permanent magnets and is positioned between the one or more permanent magnets and the rear surface of the display device when the extension is in the mounted location.

* * * * *